Oct. 5, 1954 R. STUART-WILLIAMS ET AL 2,691,157

MAGNETIC MEMORY SWITCHING SYSTEM

Filed June 26, 1953 3 Sheets-Sheet 1

INVENTORS
Raymond Stuart-Williams
& Milton Rosenberg

BY Samuel Lindenberg
ATTORNEY

INVENTORS
Raymond Stuart-Williams
& Milton Rosenberg
BY Samuel Lindenberg
ATTORNEY INVENTOR.
Raymond Stuart-Williams
& Milton Rosenberg
BY Samuel Lindenberg
ATTORNEY Patented Oct. 5, 1954 2,691,157

UNITED STATES PATENT OFFICE 2,691,157

MAGNETIC MEMORY SWITCHING SYSTEM

Raymond Stuart-Williams, Pacific Palisades, and Milton Rosenberg, Santa Monica, Calif., assignors to Radio Corporation of America, a corporation of Delaware Application June 26, 1953, Serial No. 364,403

8 Claims. (Cl. 340—174)

This invention relates to magnetic switches and more particularly to an improvement in the method and apparatus for selective magnetic switching required to operate a magnetic matrix memory.

In an article in the RCA Review for June, 1952, by J. A. Rajchman, entitled "Static Magnetic Matrix Memory and Switching Circuit," there is described a method and apparatus for switching a memory matrix. By "switching a memory matrix" is meant the applications of pulses to a magnetic core in a memory matrix for the purpose of altering its magnetic polarity for either writing binary information therein or determining the content of the information stored in that core. The article describes the magnetic matrix memory as comprising a plurality of magnetic cores preferably having rectangular hysteresis characteristics. The cores are all arrayed in rows and columns. Each column of cores has associated therewith a column coil which is inductively coupled to all the cores in that column; each row of cores has associated therewith a row coil which is inductively coupled to all the cores in that row. A reading coil is inductively coupled to all the cores in the memory.

Information is stored in a core of the memory by driving it to saturation P or driving it to saturation N, P–N representing the opposite magnetic polarities. To drive a core to P or N, in the direction required to achieve the desired result, currents are applied to the row coil and the column coil which intersect, and are both inductively coupled to, the desired core. To determine the information stored in a core, the proper row and column coil which are coupled to that core are excited in one direction always (to provide a drive toward P). If an output voltage is induced in the reading winding, then the particular core interrogated was at N. If substantially no output voltage appears in the reading winding, then the interrogated winding was at P. Means must be provided for restoring that particular core to the condition N after interrogation, since the act of interrogation has driven the core in N to P.

Figure 3:
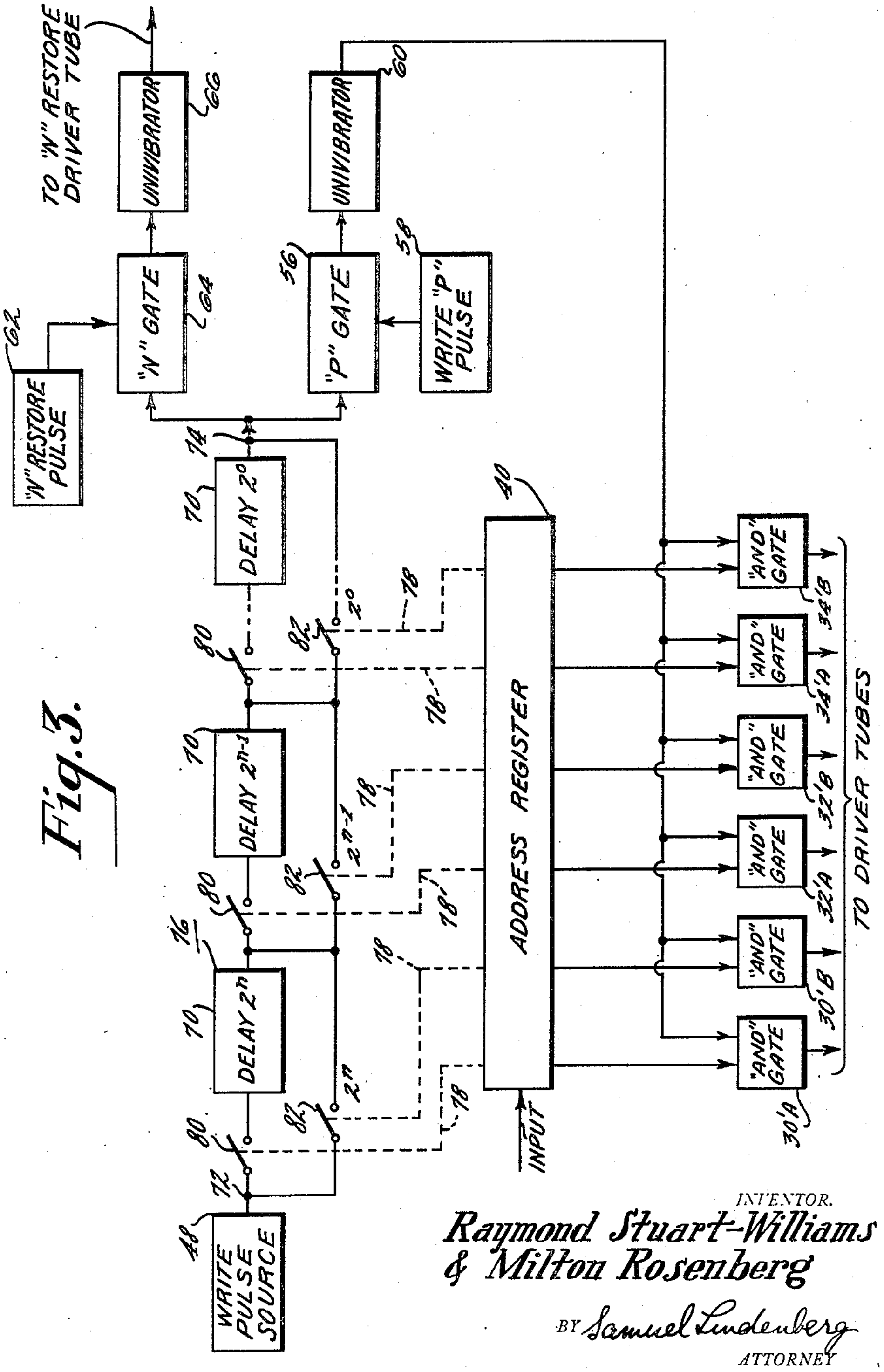

In Fig. 3 of the article, there is shown and described a magnetic switch. This comprises a stack of cores which are all usually, in their standby condition at N. A number of selecting windings are coupled to all the cores in accordance with a desired combinatorial code (in the figure of the article this is chosen as binary). These coils serve as the plate loads of a number of tubes which are used for selection or addressing the proper coils whereby only one of all the cores is driven to condition P, the remainder of the cores being left at N. Each core has an output coil.

Figure 4:
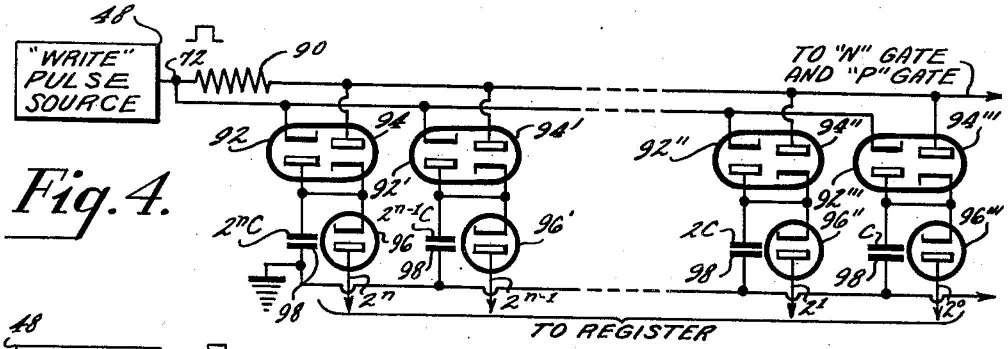

In Fig. 4 of the article, a magnetic memory is shown as being driven by two magnetic switches. One switch is used to drive the column coils and the other switch is used to drive the row coils. It will be appreciated that in order to drive a selected one of the magnetic memory cores, a drive must be applied to that core from both the row and column coils which are coupled to it. These row and column coils are the output coils of the switching cores. Accordingly, by simultaneously driving from N to P one core in the switch driving the row coils, and one core in the switch driving the column coils, the voltages induced in the output coils may be used to drive the selected memory core to P. In order to restore a memory core from P to N the two switch cores which were driven to P may be simultaneously restored to N by exciting the N restore coil in each switch.

If it is desired to leave the core in the memory, which has been driven to P, at P, then the restoration of the X and Y, or row and column, switch cores must be in sequence. A sequential restoration only applies one-half the required magnetomotive force at a time to the desired memory core. In view of the substantial rectangularity of the hysteresis characteristic of the memory cores, the memory cores are left substantially unaffected by any magnetomotive force which is less than a critical value determined by the core characteristics. Any application of excitation to a row coil alone or a column coil alone is always made to have an amplitude less than this critical value. However, the sum of the excitations to a row and a column coil are always made to have an amplitude in excess of this critical value.

The time of propagation of signals through selective magnetic switches of the general type described in this article compares appreciably with the total time of operation. It is usually desired that each driving coil have a fairly large number of turns on each switch core and the output coil have a fairly low number of turns. This type of wiring has the effect of reducing the current requirements and increasing the voltage requirements, thus matching the switch to both the vacuum tube driving source and to the magnetic memory matrix. This may be likened to a transformer wherein the turns of the selecting coils are the primary windings and the turns of the output coil are the secondary windings. However, considering a selecting coil, each of its windings on every core of the switch has an inductance which is proportional to the square of the number of turns. There is also some capacitance to ground which is approximately proportional to the number of turns. Hence, a selecting coil behaves in the manner of a delay line and a pulse applied thereto operates on each core a little later than the preceding one.

It should be appreciated that, to operate a matrix wherein two magnetic switches drive a magnetic memory, there must be a coincidence of signals from the switches at the selected memory core. Where a switch is of a reasonable size such coincidence may be difficult, if not impossible, to attain in view of the different delay line effects described above. Therefore, the size of a magnetic memory, as well as the switch size, is limited.

It is an object of the present invention to obviate the restriction on the size of a magnetic switch memory due to delay line effects.

It is a further object of the present invention to provide a novel apparatus for eliminating delay line effects in magnetic switches.

Still another object of the present invention is to provide apparatus whereby there is coincidence in the drives resulting from the outputs of two magnetic switches regardless of which of the switch cores are driven.

These and further objects of the invention are obtained by providing apparatus wherein the address on a magnetic switch core is transformed into a delay which is inserted in the drive to that magnetic switch core whereby the driving pulses applied to each magnetic switch core occur simultaneously. This insures that the output from the cores also occurs simultaneously whenever it is so desired.

Figure 1:
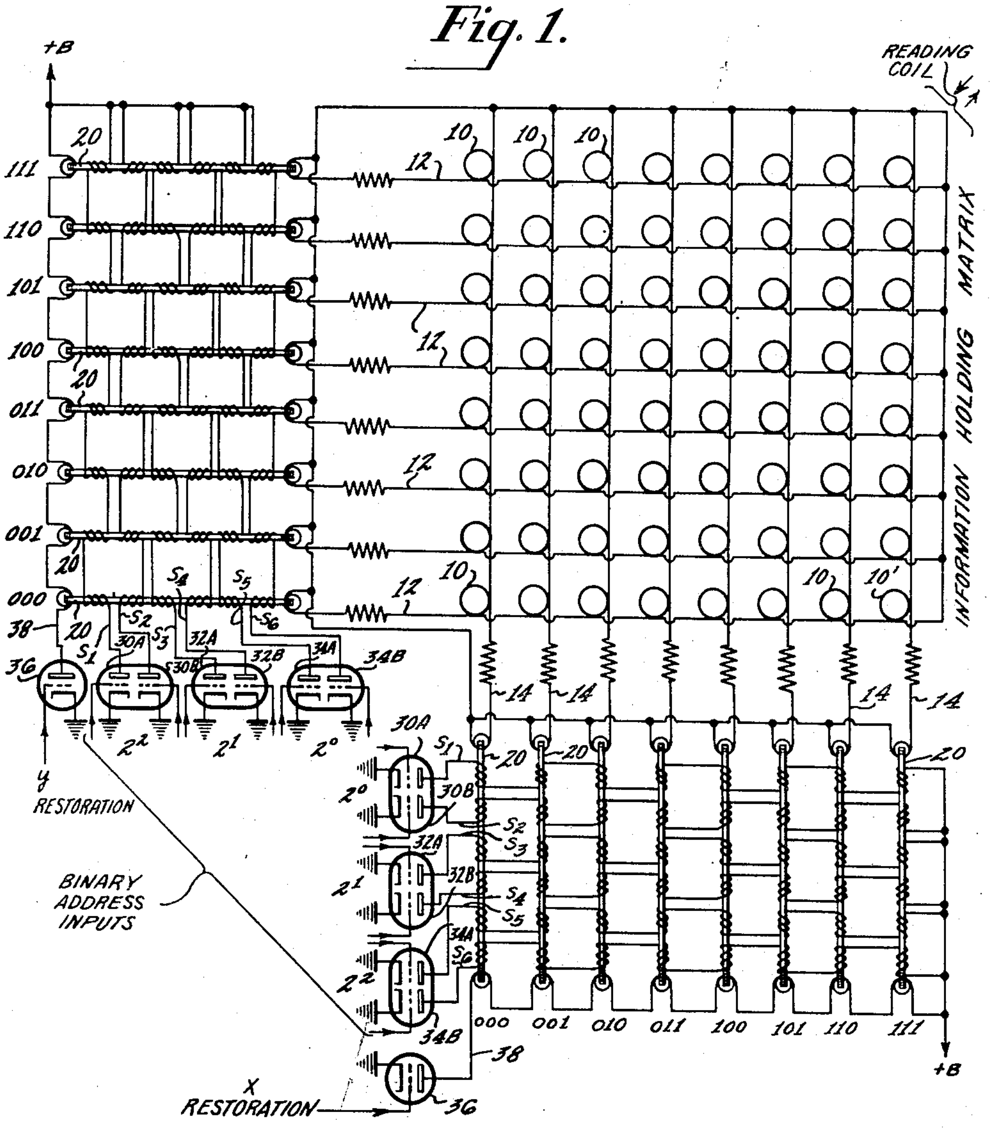
Figure 2:
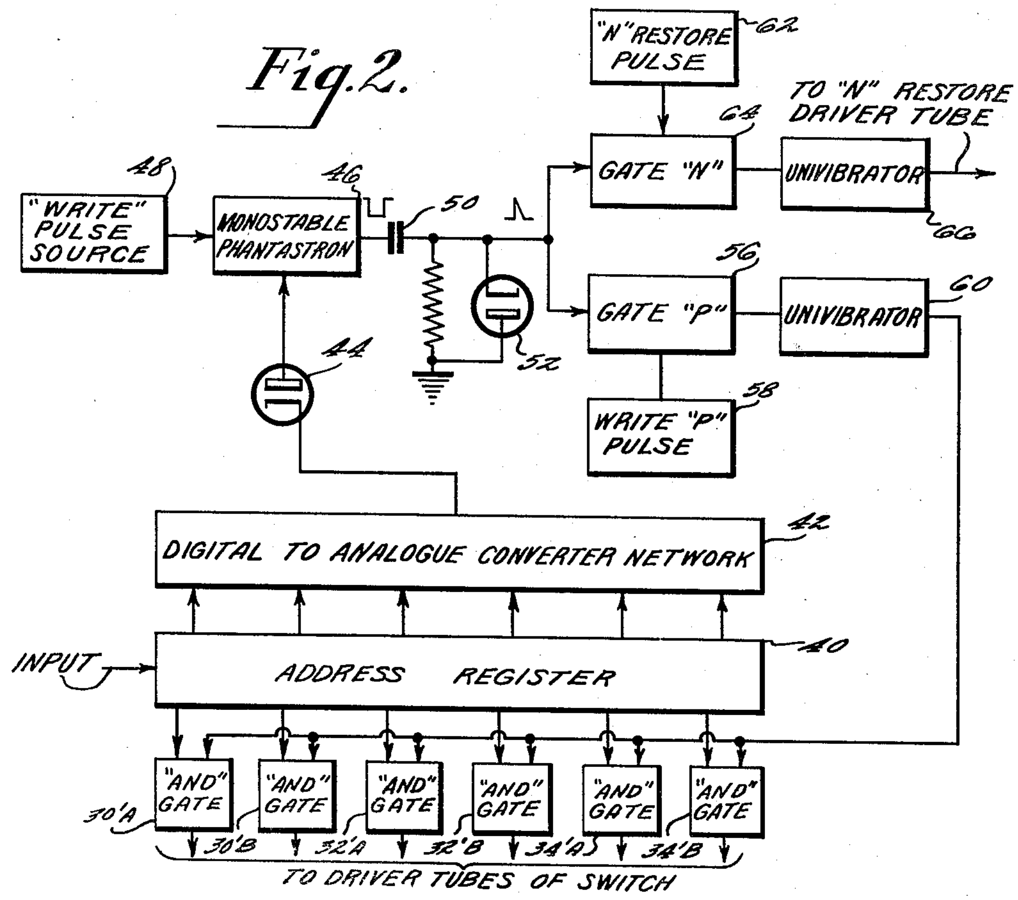
Figure 5:
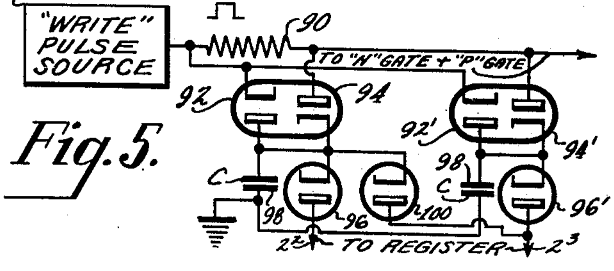

The novel features of the invention, as well as the invention itself, both as to its organization and method of operation will best be understood from the following description when read in connection with the accompanying drawings, in which Figure 1 is a schematic representation of a magnetic memory matrix being driven by two magnetic switches, Figure 2 is a schematic diagram of one embodiment of the invention, and Figures 3, 4 and 5 are schematic diagrams of a second embodiment of the invention.

Figure 1 in this application is the same as Figure 4 in the above noted article by Rajchman. It is reproduced here for the purpose of better explaining the problem in obtaining a coincident drive from two magnetic switches as well as the solution thereof.

Figure 1 herein may also be seen fully described and claimed as Figure 15 in an application by Jan A. Rajchman which is assigned to a common assignee, Serial No. 275,622, filed March 8, 1952, for "Magnetic Matrix and Computing Devices."

The magnetic matrix memory cores 10, the row coils 12 and the column coils 14 are all shown schematically in order to reduce the complexity of the drawing. The X and Y, or row and column selecting switches each consist of a number of cores 20, one for each column or row in the memory matrix, as the case may be. Each core 20 in the switch has a binary number assigned thereto. The sense of the coupling of the selecting coils $S_1$—$S_6$ is in accordance with a binary code. Each selecting coil pair is identified with a digit in the binary number assigned to all the cores. One of the two selecting coils in a pair $S_2$, $S_4$, $S_6$ is excited if the digit is a zero, and the other of the two selecting coils $S_1$, $S_3$, $S_5$ is excited if the digit is a one. The sense of the turns of the windings of the selecting coils on each core is selected so that by exciting the selecting coils in accordance with a core identifying number, which may be termed the switch core address, only the windings on the selected core having a P going sense are excited. One or more windings on the remaining cores having an N going sense are excited, thus preventing these cores from being driven to P. As an example, let it be desired to excite the magnetic matrix core 10' in the lower right hand corner of the memory matrix. This requires the application of a drive to the Y or row coil switch core bearing the address 000 and the X or column coil switch core bearing the address 111. Such selection is made in the case of the row coil switch by exciting the left hand coil in each pair, and, in the case of the column coil switch, is made by exciting the right hand coil in each pair. This is done by simultaneously applying driving signals to the control grids of the driver tubes 30A, B, 32A, B, 34A, B, which have these coils as their respective plate loads.

It will be appreciated that, as a result of any delay line effects occurring because of the inductive and capacitive impedances of the selecting coils, the 000 core in the row coil switch will turn over before the 111 core in the column coil switch can turn over. Hence, the memory core can remain substantially unaffected. This condition cannot be tolerated, as the correct operation of the memory matrix relies on the coincidence of signals. This difficulty could be overcome by delaying the driving signals to one switch with respect to the other so that the X and Y switch output would be coincident in time. Such an attack, however, has the disadvantage that the output signal from a switch core, and accordingly a memory core, would vary in time depending on its position. A preferable method is to insert delays in the application of a signal to both the X and Y switches. If the delay time per core is $t_0$ and the memory core is in position $x$, $y$, and assuming there are $n$ cores in each switch, then the correct delay to be inserted is $(n-x)t_0$ in the $x$ direction
$(n-y)t_0$ in the $y$ direction Then the total delay is $(n-x)t_0+xt_0=nt_0$ in X
$(n-y)t_0+yt_0=nt_0$ in Y and the signals are coincident.

But if $n$, $x$ and $y$ are expressed in binary numbers, then $(n-x)$ is equal to the complement of $x$, all redundant more significant digits being neglected.

Hence delays should be inserted that are proportional to the complement of the desired addresses. The insertion of these delays makes it possible to increase the number of primary turns on the switches and hence to improve the match of the switch to the driving source. This is essential if reasonable economy of power in the driving tubes is to be achieved.

It is noteworthy that any delays required for obtaining the coincidence signals at a particular memory core which are applied in driving the switch cores must also be applied in restoring the switch cores to their N or standby condition if it is desired to bring the magnetic memory core back to the condition N. In other words, if the switch cores are to be simultaneously restored, then the same delay must be inserted as is inserted when the switches are simultaneously driven. Each switch is restored to N by applying a signal to the tube 36 which has the N restore coil 38 as its plate load.

Figure 2 shows a schematic diagram of one system for providing the required delays to the address signals being applied to the driver tubes of a magnetic switch. A flip-flop register 40 of the type which consists of a number of binary stages or bistable multivibrators each of which may be set to have one or the other of its two outputs with a high potential to represent a zero or a one is employed for the purpose of staticizing, or setting up as steady state voltage levels, in binary digital form, the address of the switch core selected. Such binary registers are well known in the art, and, for example, are described in Patent No. 2,591,931 to Grosdoff, or in a book, High Speed Computing Devices, by Engineering Research Associates, on pages 277, 279, Chapter 3. One "and" gate 30'A, B—34'A, B is provided for and associated with each of the driver tubes 30A, B—34A, B employed in a magnetic switch. The output of the address register 40 is applied to these "and" gates to prime them in accordance with the dictates of the staticized address. These "and" gates may be of the type which are described in High Speed Computing Devices, by Engineering Research Associates, chapter 4, or in an article by Felker in Electrical Engineering, December, 1952, entitled "Typical Block Diagrams for a Transistor Digital Computer." "And" gates require that at least two inputs be simultaneously present before an output is obtained. One input may be said to prime an "and" gate so that the second input causes it to provide an output. The output from each "and" gate is applied to the grid of an associated driver tube 30A, B—34A, B to drive the selecting coils $S_1$–$S_6$ of a switch. Therefore, since the address register primes certain ones of the "and" gates in accordance with the address entered therein, only those tubes will be driven when the "and" gates are operated which apply selecting currents to the switch core whose address is indicated in the address register.

A second part of the output of the address register is applied to a rectangle which is labeled a "Digital to Analog Converter Network" 42. This network is of the type shown and described on pages 63 through 66 as a "Decoder" in a report R-211 entitled "A Magnetic Matrix Switch and Its Incorporation into a Coincident-Current Memory," by Kenneth H. Olsen, which was made by the Digital Computer Laboratory, Massachusetts Institute of Technology on June 6, 1952. The address information is provided in digital form to the digital to analog converter network 42. The network can provide as an output one analog voltage which is representative of the digital number and another analog voltage which is representative of the complement of the digital number which expresses the address of the desired core in the switch. The latter output voltage is applied to a diode 44 which controls the pulse width of the output from a monostable Phantastron 46. The circuit diagram and description of a monostable Phantastron of a suitable type will be found described and shown in detail on page 197 of a book by Chance et al., entitled Wave Forms, published by the McGraw-Hill Book Company, and is called in the book a "screen-coupled Phantastron." This circuit, when it receives a pulse from a pulse source which may be identified as a "write pulse source" 48, will provide an output pulse having a width determined by the voltage received from the digital to analog converter network 42. The output pulse from the monostable Phantastron 46 is differentiated by a differentiation network 50 and then a diode 52 is used to bypass the negative half of the wave so that the resulting positive half of the wave, which is provided by the trailing edge of the differentiated output from the monostable Phantastron, is applied to an N gate 64 and a P gate 56 simultaneously. These N and P gates are the same as the "and" gates previously described which are coupled to the output of the address register.

If it is desired to write P, a pulse is provided from a write P pulse source 58 to prime the P gate so that upon the arrival of the positive pulse (from the monostable Phantastron) a univibrator 60 or single shot trigger circuit is pulsed by the output of the P gate. This in turn provides an output pulse which permits the "and" gates 30'A, B—34'A, B which were primed by the address register to apply the proper address signals to the switch driver tubes simultaneously.

Since the N restore coil 38 (shown in Figure 1) is coupled to all the switch cores, no "and" gate is required before the N restore tube 36. A delay of the same order as is required in writing P in a memory core is required in writing N, however. Therefore, in response to a second pulse from the write pulse source 48 and a signal from the N restore pulse source 62, the N gate 64 is opened to pass the trailing edge of the output from the Phantastron to drive another univibrator 66. The output of this is applied to the grid of the N restore tube 36. Thus the selected switch cores may be returned from P to N simultaneously carrying a selected memory core to N with them.

The X switch and the Y switch each require a system of the sort shown in Fig. 2.

Figure 3 is a general schematic drawing of another embodiment of the invention. It shows a controllable delay line which is used for the purpose of insuring the coincidence of the outputs from the row and column switches driving a magnetic memory. The amount of delay required is, as previously, determined by the address stored in the register. The address stored in the register 40 determines the number of delay elements 70 which are inserted between the input 72 and output 74 of the delay line 76, and the number of delay elements which are bypassed. This control is represented by means of the dotted lines 78 which are connected from the register to the various switches 80, 82 in the delay line. A delay element 70 may be any well known electrical delay element such as, a lumped constant R-C or L-C line, a mercury delay line or the like. A pulse from the writing pulse source 48 is applied to the input 72 of the delay line 76. If a switch core requires a maximum delay, then all the upper switches 80 are closed so that the pulse travels through all the delay elements until it arrives at the output 74 of the delay line. The delay line output is the input to the N gate 64 and P gate 56 as previously. If any one of the delay elements 70 is to be omitted by reason of the requirement for a lesser delay, the address from the register can be used to close any one of the shunting switches 82 so that the pulse from the source bypasses the delay elements.

As an illustration, if a switch has 16 cores, it could require a total of four delay elements in the delay line, the delay due to any one element being twice that of the preceding element. This is illustrated by the numeral inside a delay representing rectangle which is indicative of the amount of the delay. The binary address is complemented in this instance by the manner of connection to the delay line, the highest order trigger circuit in the register for this purpose is connected to actuate the lowest order delay element switch, and similarly the lowest order trigger circuit of the register is connected to actuate the highest order delay element switch. A number of schemes may be utilized to embody the system shown in Fig. 3. Of course, the register output may be connected to relays whose contacts serve as switches for connecting in the delay elements or for shunting them.

A preferred embodiment for the delay line may be seen in Fig. 4. The delay line consists of a resistor 90 in series with the input terminal 72. From the input terminal 72, connection is also made through a number of diodes 92, 94 to capacitors 98 which have values of capacitance selected in accordance with a binary progression, namely, for a 16-core switch, the capacitance connected to the diode 92 at the input end of the delay line would be 16 times the capacitance at the end of the delay line. The other capacitor values are selected in accordance with a binary progression 1, 2, 4, 8. From the output side of the resistor there is connected another diode 94, 94′, 94″ for each of the diodes 92, 92′, 92″ connected to the capacitors. These other diodes 94, 94′, 94″ have their anodes connected to the resistor 90 and their cathodes connected to the anodes of the first diode set 92, 92′, 92″. A third diode 96, 96′, 96″ is coupled from each of these junction points to the outputs from the address register 40. These outputs may be applied through cathode followers (not shown) or some other low impedance current supplying device. The connections to the register are, as previously indicated for Fig. 3, in a manner so that a complement of the binary address in the register is achieved.

The most significant or highest order trigger circuit in the register is coupled to the third diode at the output side of the delay line which is the one which is connected to the capacitance having the lowest value. The other trigger circuits of the register are all connected in their descending binary order to the diodes connected to the capacitors respectively in the ascending binary order. Accordingly, the address in the register serves to charge the various capacitors in the delay line complementary-wise through these diodes. For example, suppose a core number is 0011 and the time delay required for each core is $t_0$. The value of C and R are selected so that the product is proportional to $t_0$. The required delay is $1100t_0$ or $12t_0$. The connections from the register to the delay line are such as to charge up capacitors C and 2C by the 0011 address established in the register through the diodes 96‴, 96″. Any pulse from the write pulse source 48, in traveling down the delay line is delayed by having first to charge up any capacitors not previously charged up from the register. Accordingly, the time constant of the delay line is the product of the resistor times the capacitors not charged up by the register, $(4C+8C)=12RC$. A positive pulse applied to the inputs of the delay line from the writing pulse source would therefore be delayed by an interval $12t_0$.

When the driving pulse from the write pulse source 48 finishes, the capacitors, which are charged up are quickly discharged by means of the diodes 92, 92″ connected on the input side of the resistor through the write pulse source 48. This quickly restores the delay line in time for a second application of a driving pulse if required.

It has been found that in certain types of switches the delay is not a linear function of the number of cores being traversed by the driving or selecting pulses. For example, in one 16-core switch it was found that the delay increased approximately linearly until the 8th core and thereafter did not increase appreciably. In this particular switch sufficient correction could be made by correcting the most and next most significant digits only until the eighth core and thereafter correcting on the most significant digit only. A circuit for accomplishing this type of compensation is shown in Fig. 5.

The delay line circuit is arranged in much the same fashion as the previous one except that only the two most significant digits are used and the delay line circuit is connected to give the required nonlinear effect. As before, diodes 94, 94′ which have their anodes coupled to the input resistor 90 are used for charging from the write pulse source 48. The other diodes 96, 96′ are used for charging from the register 40. The diodes 92, 92′ connected between the write pulse source 48 and the capacitors 98, 98′ are used for discharging them. The product RC is arranged to be proportional to $4t_0$. If the binary number of a switch core is 0011 or less, both capacitors 98, 98′ are charged by a pulse from the write pulse source and the delay is $8t_0$. If the number of a switch core is between 0100 and 0111, the register 40 charges the first capacitor 98, thus removing the delay effect of one capacitor making the delay $4t_0$. Between switch core numbers 1000 and 1011 both capacitors 98, 98′ are charged through the diodes 96′, 100 coupled to the $2^3$ output lead from the register, thus making the delay zero. Between switch core numbers 1100 and 1111 both diodes 96′, 100 coupled to the $2^3$ lead, are still operated and therefore the delay is still zero. Hence the desired compensation has been achieved.

It is obvious that almost any type of nonlinear delay encountered in practice may be compensated by suitable arrangement of the diode switches and therefore the method is applicable whatever the nature of the delay.

The various pulse sources designated as "write pulse source," "N restore pulse source" and "write P source," as well as the univibrators, may all be univibrators or one shot flipflops of the type found described on page 50 et seq. in a book by O. S. Puckle, entitled Time Bases, published by John Wiley and Sons, 1st edition.

There has been shown and described hereinabove a novel and useful system for eliminating the delay factors occurring in magnetic switches which prevent the coincidence in drives from those switches when they are used for driving apparatus requiring switch output coincidence.

What is claimed is:

1. In a magnetic memory system of the type wherein a first and a second magnetic switch, each including a plurality of magnetic cores, and means to selectively drive one of said cores, are arranged to selectively drive the magnetic cores of a magnetic matrix memory, apparatus for insuring the coincidence of the drives from both switches to a core in said memory comprising, for each switch, means to establish the address of a magnetic switch core selected to be driven, means to generate driving currents for driving a selected magnetic switch core, and means for delaying the application of said driving currents to said selected magnetic switch core for a time controlled by said means in which said address is established.

2. In a magnetic memory system of the type wherein a first and a second magnetic switch, each including a plurality of magnetic cores and means to selectively drive one of said cores, are arranged to selectively drive the magnetic cores of a magnetic matrix memory, apparatus for insuring the coincidence of the drive from each switch to a core in said memory comprising, for each switch, digital register means to establish the address of a switch core selected to be driven, an inoperative gate means, means to render said gate means operative after an interval the length of which is controlled by the address in said register means, and means to generate driving currents for driving a selected magnetic switch core responsive to said gate means becoming operative.

3. In a magnetic memory system as recited in claim 2 wherein said means to render said gate means operative after an interval the length of which is controlled by the address in said register means includes network means coupled to said register means to provide a signal which is an analogue representation of the complement of the address in said digital register means, means to generate a signal to render said gate means operative, and means to delay the application of a signal generated by said last named means to said gate means for a time determined by the signal from said means to provide said analogue representation signal.

4. In a magnetic memory system as recited in claim 2 wherein said means to render said gate means operative after an interval the length of which is controlled by the address in said register means includes a controllable delay line having a pair of input terminals a pair of output terminals, a resistor connected in series between said input and output terminals, a plurality of condensers, a separate rectifier means connected to each of said plurality of condensers, and means connecting said condenser and rectifying means across said output, means coupling said register to said plurality of condensers to place a charge on some of said condensers in accordance with the address in said register, and means to apply a signal to said delay line input terminals to charge up the remaining ones of said condensers before rendering said gate means operative.

5. In a magnetic memory system of the type wherein a first and a second magnetic switch, each including a plurality of magnetic cores and means to selectively address each core, are arranged to selectively drive the magnetic cores of a magnetic matrix memory, apparatus for insuring a coincidence of the drives from both switches to a core in said memory comprising, for each switch, a digit register, means to establish the address of a core desired to be driven in said register, a plurality of inoperative gates, one for each digit in said register, means to prime said inoperative gates for operation in accordance with the address in said digit register, means to generate driving currents for said desired core responsive to operation of said gates, means coupled to said digit register to generate a signal which is an analogue representation of the complement of the address in said digital register, means to generate a signal to operate the inoperative gates primed by said digit register, and means to control said last named means to delay the application of a signal therefrom to said gates for a time determined by said analogue signal.

6. In a magnetic memory system of the type wherein a first and a second magnetic switch are arranged to selectively drive the magnetic cores of a magnetic matrix memory, each switch including a plurality of magnetic cores, means to selectively address each core to thereby drive it from one polarity to the opposite polarity, and means to restore said cores to said one polarity, apparatus for insuring a coincidence of drives from both switches comprising, for each switch, a digit register, means to establish the address of a core desired to be driven in said register, a plurality of inoperative gates, one for each digit in said register, means to prime said inoperative gates for operation in accordance with the address in said digit register, means to generate driving currents for said desired core responsive to operation of said gates, means coupled to said digit register to generate a signal which is an analogue representation of the complement of the address in said digital register, means to generate a signal to operate the inoperative gates primed by said digit register, and means to control said last named means to delay the application of a signal therefrom to said gates for a time determined by said analogue signal, an operative means to generate a restoring current for said switch cores, means to apply a delayed signal from said gate signal generating means to render operative said inoperative means to generate a restoring current and means to apply said restoring current to said means to restore said cores to said one polarity.

7. In a magnetic memory system of the type wherein a first and a second magnetic switch, each including a plurality of magnetic cores and means to selectively address each core, are arranged to selectively drive the magnetic cores of a magnetic matrix memory, apparatus for insuring a coincidence of the drives from both switches to a core in said memory comprising, for each switch, a digit register, means to establish the address of a core desired to be driven in said register, a plurality of inoperative gates, one for each digit in said register, means to prime said inoperative gates for operation in accordance with the address in said digit register, means to generate driving currents for said desired core responsive to operation of said gates, a controllable delay line, means to establish the delay provided by said delay line proportional to the complement of the address in said digit register, means to apply a signal to the input end of said delay line, and means to apply the output from said delay line to said primed gates to render them operative.

8. In a magnetic memory system of the type wherein a first and a second magnetic switch are arranged to selectively drive the magnetic cores of a magnetic matrix memory, each switch including a plurality of magnetic cores, means to selectively address each core to thereby drive it from one polarity to the opposite polarity, and means to restore said cores to said one polarity, apparatus for insuring a coincidence of drives from both switches comprising for each switch a digit register, means to establish the address of a core desired to be driven in said register, a plurality of inoperative gates, one for each digit in said register, means to prime said inoperative gates for operation in accordance with the address in said digit register, means to generate driving currents for said desired core responsive to operation of said gates, a controllable delay line, means to establish the delay provided by said delay line proportional to the complement of the address in said register, means to apply a signal to the input end of said delay line, and electronic switch means at the output end of said delay line to apply its output as desired to said primed gates to render them operative or to means to generate a restoring current to render that means operative.

No references cited.